SELF POWERED COMPRESSIONAL WAVE TRANSMITTER

Filed April 20, 1959 2 Sheets-Sheet 1

INVENTOR.
Meyer Marks
BY John L. Wiegreffe
ATTORNEY

Feb. 12, 1963    M. MARKS    3,077,574

SELF POWERED COMPRESSIONAL WAVE TRANSMITTER

Filed April 20, 1959    2 Sheets-Sheet 2

INVENTOR.
Meyer Marks
BY John L. Wiegreffe
ATTORNEY

United States Patent Office 3,077,574
Patented Feb. 12, 1963

3,077,574

SELF POWERED COMPRESSIONAL WAVE TRANSMITTER

Meyer Marks, Clarendon Hills, Ill., assignor to Admiral Corporation, Chicago, Ill., a corporation of Delaware
Filed Apr. 20, 1959, Ser. No. 807,516
6 Claims. (Cl. 340—15)

This invention relates to a manually actuatable electric power source and to the combination thereof with apparatus for producing compressional waves such as ultra-sonic waves of predetermined frequency or frequencies or of a predetermined carrier frequency amplitude modulated at one or more predetermined lower frequencies. It is an object of the invention to provide improved apparatus of that character.

Apparatus embodying the present invention is particularly adapted to the remote control of television receiving sets and stereophonic systems, although it will be recognized by those skilled in the art as being of broad applicability. Apparatus which employs electronic circuitry in the remote control of television receiving sets is commonly powered by dry cells. Even though the circuitry may require little power, battery life is still limited to the shelf life of the battery. Accordingly, the user is subject to the bothersome requirement of battery replacement.

According to the preferred embodiment of the present invention, electronic apparatus for producing signals in the form of ultrasonic waves is powered by a magneto, which may, in turn, be actuated by mere finger tip manipulation. The magneto may be employed merely as a power source to energize circuitry which is capable of producing ultrasonic waves of predetermined frequency or of different, predetermined, distinguishable frequencies. The magneto may, in addition, be employed to modulate the amplitude of the output sound wave at a plurality of predetermined lower frequencies. In this case, the basic ultrasonic wave, whose frequency is determined by the electronic circuitry, serves as a carrier wave for the selected lower frequency, determined by the magneto.

Preferably, the magneto of the present invention is employed with the apparatus disclosed and claimed in a copending application Serial Number 809,052, entitled "Signal Apparatus," filed April 27, 1959, by the same inventor and assigned to the same assignee as the present application. It may, however, be employed with other forms of apparatus and is of broad applicability.

It is an object of the invention to provide an improved power source for signal apparatus having small power requirements.

It is another object of the invention to provide an improved power source for energizing signal apparatus and for modulating the amplitude of the signal produced thereby at a predetermined frequency.

It is a further object of the invention to provide an improved power source for energizing signal apparatus and for modulating the amplitude of the signal produced thereby at any selected one of a plurality of predetermined frequencies.

It is a still further object of the invention to provide improved signal apparatus for producing compressional waves such as ultrasonic waves of predetermined frequency or frequencies.

Another object of the invention is to provide improved signal apparatus for producing ultrasonic waves of a predetermined carrier frequency, amplitude modulated at any one of a plurality of predetermined selectable lower frequencies.

A further object of the invention is to provide improved apparatus for producing a signal of predetermined characteristics, which apparatus is powered by finger tip manipulation.

A still further object of the invention is to provide improved apparatus having various of the features described above while being small in size, reliable in operation and inexpensive to manufacture.

Further features of the invention pertain to the particular arrangement of the elements of the signal apparatus and of the electric power source, whereby the above outlined and additional features thereof are attained.

The invention, both as to its organization and method of operation, together with further objects and advantages thereof, will best be understood by reference to the following specification, taken in connection with the accompanying drawings, in which.

Figure 1:
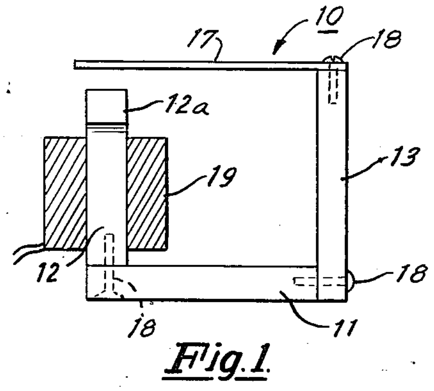
FIGURE 1 is a side elevational view of a magneto constituting one feature of the present invention with the coil thereof shown in section.
Figure 2:
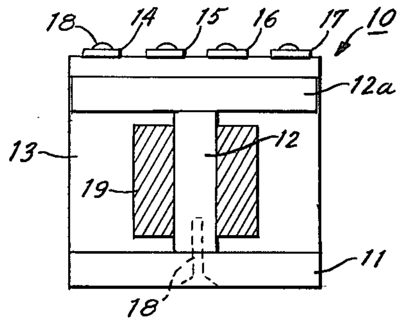
FIG. 2 is an end elevational view of the same magneto.
Figure 4:
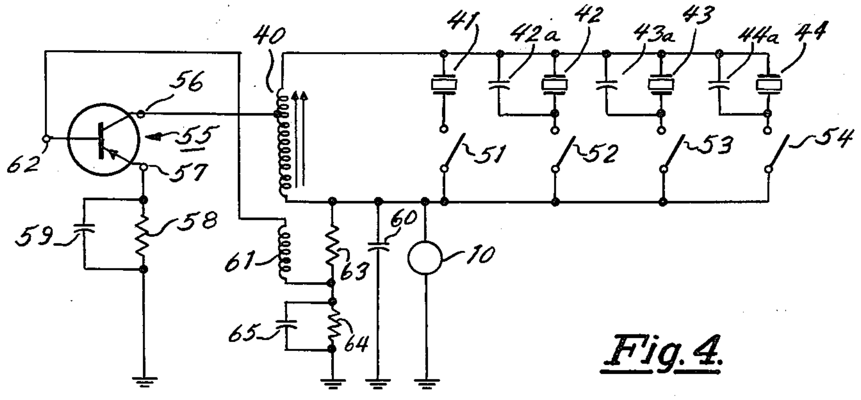
FIG. 4 is a circuit diagram illustrating an embodiment of the invention adapted primarily to the production of ultrasonic waves of a plurality of predetermined frequencies.
Figure 3:
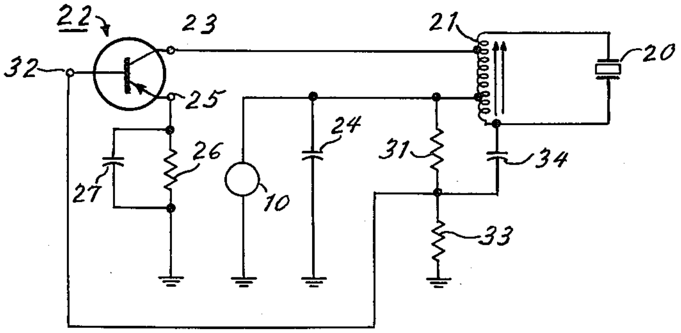
FIG. 3 is a circuit diagram illustrating an embodiment of the invention adapted primarily to the production of ultrasonic waves which are amplitude modulated at selectable predetermined frequencies.
Figure 5A:
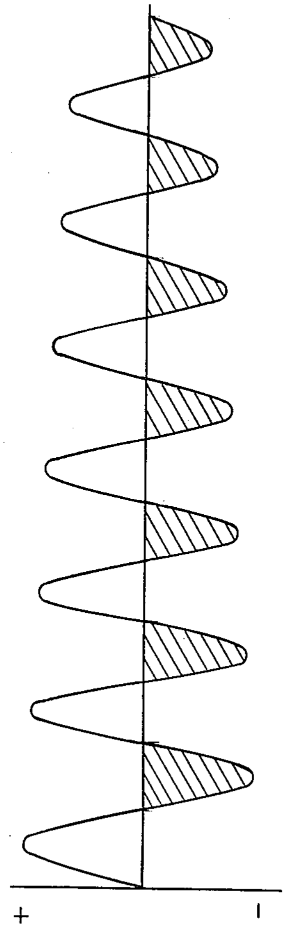
Figure 5B:
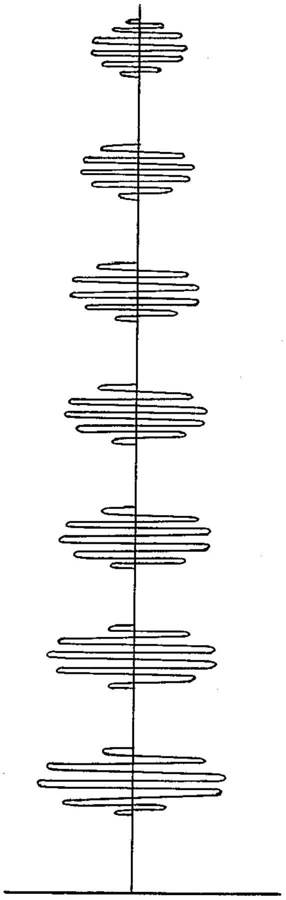

FIG. 5*a* is a graphic representation of the voltage output of the magneto of FIGS. 1 and 2; and FIG. 5*b* is a graphic representation of an ultrasonic wave which may be produced by the embodiments of the invention illustrated in FIGS. 3 and 4.

A magneto 10 is illustrated in FIGS. 1 and 2 which includes a base 11 and an upright post 12, both consisting of permeable material such as soft iron. A second upright post 13 at the other end of the base 11 comprises a permanent magnet. The magnet post 13 may be polarized such that the upper end is the north pole and the lower end is the south pole, or vice versa. Four reeds 14, 15, 16 and 17 are secured to the upper edge of the permanent magnet 13 and extend toward the post 12, these reeds also being of permeable material. The magnetic circuit of the magneto 10 is completed by a soft iron bar **12*a* which is secured to the top of the post 12 and extends laterally under the reeds 14–17 with an air gap being provided between the reeds and the bar 12*a*. These various parts of the magnetic circuit of the magneto 10 may be secured together by any suitable means such as screws 18, or any other conventional means, such as welding, cementing, etc. It will be appreciated that the air gap between the bar 12*a* and the reeds 14–17 should be of such magnitude that the reeds may vibrate with the desired amplitude without striking the bar. A coil 19, having a substantial number of turns, is arranged around the post 12** and is provided with suitable leads for making electrical connection thereto.

The reeds 14–17 are made to have four different predetermined resonant frequencies. This may be accomplished by adjusting the mass of different small weights fastened to the free ends of the reeds, by making the reeds of different lengths, or by making the reeds of different stiffness. In one practical embodiment of the invention, the four resonant frequencies of the four reeds lie within the audible range but the invention is not limited to any range of resonant frequencies.

In the simplest form of the invention, the reeds 14–17 may be manually plucked. In a more acceptable commercial embodiment of the invention, it is contemplated that apparatus be provided through which the reeds may be selectively excited through push buttons or other conventional signal selecting apparatus. Since such apparatus for selectively exciting the reeds does not constitute a feature of the present invention and may be of various forms, or omitted entirely, it is not shown or described in detail herein.

Plucking of any one of the reeds 14–17 causes oscillation of the free end thereof toward and away from the bar 12*a* and thereby produces a variation in the air gap between the vibrating reed and the bar 12*a*. The resulting change in reluctance of the magnetic circuit induces a voltage in the coil 19. Where a plurality of reeds are employed, those reeds which are not selected for vibration are preferably held away from the bar 12*a* whereby the non-selected reeds reduce variation of reluctance by partially by-passing the magnetic path through the selected reed. Where apparatus is provided for excitation of the reeds through push buttons or other conventional signal selecting apparatus, this same apparatus may be arranged to hold the unselected reeds away from the bar 12*a*. Again, such apparatus does not constitute a feature of the present invention and therefore is not shown or described in detail herein.

The output voltage of the magneto 10 may assume the form graphically illustrated in FIG. 5*a*. The envelope of the voltage wave may be seen to decrease following the initial excitation of one of the reeds, this decay being exponential as is well understood in the art. Where the magneto is employed as a power source in apparatus for producing sound waves which actuate control apparatus at a receiving station, it is necessary that the radiated compressional wave be of some substantial duration. In the remote control of television receiving sets, for example, it is commonly required that the control signal endure at least for a period of time on the order of one-tenth of a second. It has been found that the magneto 10 is capable of supplying the necessary power to ultrasonic wave producing apparatus such as that illustrated in FIGS. 3 and 4 for substantially more than the requisite period of time.

The apparatus of FIG. 3 is intended to produce an ultrasonic wave of a single frequency which is selectively amplitude modulated by two or more frequencies of substantially lower value, namely the resonant frequencies of the reeds 14–17. In accordance with a preferred embodiment of the invention, the carrier frequency is 40,000 cycles per second, whereby the transmitted signal is inaudible. The modulating frequencies may be 100, 115, 135 and 160 cycles per second.

The ultrasonic producing apparatus of FIG. 3, with exception of the magneto 10, may be substantially identical to apparatus disclosed and claimed in the copending application referred to above. It includes a piezoelectric transducer 20 which is connected across an inductive coil 21 as shown. The piezoelectric transducer 20 may be of conventional form and, therefore, is not described in detail herein. For the purpose of appreciating the present invention, it is necessary to understand only that the transducer 20 includes a piezoelectric element with suitable electric terminals and physical mounting such that electrical excitation of the piezoelectric element through its electric terminals causes mechanical vibration thereof which is transmitted to the surrounding air.

As is also well understood in the art, any given piezoelectric element has a natural or resonant frequency. The piezoelectric element included in the transducer 20 is selected to have a resonant frequency equal to the frequency of the ultrasonic wave that is intended to constitute the carrier wave to be generated and radiated. In the specific embodiment of the invention illustrated in FIG. 3, the piezoelectric element of the transducer 20 should, therefore, have a resonant frequency of 40,000 cycles per second.

The inductive coil 21 is preferably slug tuned, and the inductance of the coil and the capacity of the transducer form an LC circuit which resonates at the resonant frequency of the transducer, or 40,000 cycles per second.

This LC circuit is excited by apparatus including a transistor 22 and the magneto 10, the magneto 10 and the LC circuit being connected in series across the output leads of the transistor 22. More specifically, a tapped point on the coil 21 is connected to the collector lead 23 of the transistor as shown. A second tapped point on the coil 21 is connected to one lead of the magneto 10, the other magneto lead being represented as connected to ground. A bypass capacitor 24, for the lowest modulating frequency which may be made to resonate with the inductance of coil 19, is connected across the magneto leads as shown. The output circuit of the transistor 22 is completed by connection of the emitter lead 25 to ground through a bias resistor 26 and a bypass capacitor 27 for the carrier frequency.

Feedback is provided from the second mentioned tapped point on the coil 21 through a resistor 31 to the base 32 of the transistor. The base lead is also connected to ground through a resistor 33, the two resistors 31 and 33 forming a voltage divider, with the base lead 32 of the transistor being connected to the intermediate point. A coupling capacitor 34 for the carrier frequency is shown connected between the base lead 32 and one end of the coil 21.

As will be apparent to those skilled in the art, energization of the magneto 10 by actuation of a reed 14–17 will cause oscillation of the circuit of FIG. 3 at a frequency governed by the LC circuit comprising the coil 21 and the transducer 20. The circuit shown in FIG. 3 comprises a Hartley oscillator. It will be understood, however, that the LC circuit and the magneto may be employed in various other types of oscillator circuits.

Energization of the oscillator circuit causes excitation of the transducer 20 whereby it produces sound waves at a frequency of 40,000 cycles per second, this being the resonant frequency of both the transducer and the LC circuit of which it forms a part. In the illustrated application of the invention, it is intended that this 40,000 cycles per second ultrasonic wave serve as a carrier. This carrier wave is amplitude modulated by the resonant frequency of the reed 14–17 of the magneto 10 which is actuated to energize the magneto and the oscillator circuit.

Referring again to FIG. 5*a*, it will be noted that the lower or negative half cycles of the magneto voltage wave are shaded, these shaded half cycles representing the effective portion of the magneto output. It will be appreciated that the transistor 22 functions as a rectifier, the transistor and the oscillator circuit being operative only when the emitter 25 is negative with respect to the collector 23. Accordingly, operation of the oscillator circuit is intermittent, and the output ultrasonic wave of the transducer 20 will be of the character represented in FIG. 5*b*. More specifically, the transducer output will consist of short bursts of 40,000 cycle per second ultrasonic waves each having a duration of approximately one half cycle of the selected reed 14–17. In addition, the amplitude of the 40,000 cycles per second wave grows to a maximum as the instantaneous voltage output of the magneto reaches a peak, and reduces to zero as the instantaneous voltage of the magneto approaches zero value.

It is intended that a receiving station, which does not constitute a part of the present invention, be tuned to the carrier frequency of 40,000 cycles per second and include circuitry responsive only to predetermined frequencies of amplitude modulation of the carrier wave. Accordingly, selective actuation of the various reeds 14–17 may initiate selected operations at the receiving station by virtue of the different frequency of amplitude modulation of the carrier wave caused thereby.

In accordance with this embodiment of the invention, actuation of any one of the reeds 14–17 not only energizes the ultrasonic producing apparatus to cause the generation and broadcasting of a carrier ultrasonic wave but causes amplitude modulation of the carrier wave at a selected frequency, namely the resonant frequency of the actuated reed.

As opposed to this, the magneto 10 as employed in the circuit of FIG. 4 serves merely as a power source to energize apparatus which is, in itself, oscillatory at four different predetermined frequencies. In this application of the magneto, the low frequency of the actuated reed is not utilized in the discrimination of signals. Accordingly, only one reed need be provided in the magneto, and its resonant frequency need not be of any particular value. If preferred, the output of the magneto may be passed through a full wave rectifier and a suitable filter in a manner well known in the art.

The apparatus of FIG. 4 includes an inductive coil 40 and four piezoelectric transducers 41, 42, 43 and 44, the various transducers being resonant at any four frequencies of ultrasonic waves that are desired to be produced by the apparatus. In accordance with a preferred embodiment of the invention, these frequencies are 38,-285, 39,285, 40,805 and 41,805 cycles per second. One terminal of each transducer is connected in common to one end of the coil 40 as shown. Selectively operable switches 51, 52, 53 and 54 are provided for connecting the other terminal of any selected one of the transducers 41–44 to the other end of the coil 40 to form an LC circuit which is resonant at the resonant frequency of the corresponding transducer. In the interest of economy, it is preferred that the transducers be identical with the exception of the difference between the resonant frequencies thereof. Capacitors 42*a*, 43*a* and 44*a*, are, therefore, arranged to parallel transducers 42, 43 and 44 respectively, these capacitors being of such capacitive values as to make the total capacity of each capacitor and the associated transducer resonant with the inductance of the coil 40 at the resonant frequency of the associated transducer. Alternatively, the various possible LC circuits may be tuned to the resonant frequency of the corresponding transducers by the inclusion of additional inductance in the various LC circuits upon the closing of a selected switch 51–54, all in the manner disclosed in the copending application referred to above.

Any selected LC circuit which is completed by the closing of one of the switches 51–54 is arranged to be excited by a circuit including a signal translating device 55 which is preferably a transistor. The collector lead 56 of the transistor is connected to a tapped point on the coil 40 as shown, and one end of the coil 40 is connected to one lead of the magneto 10, the other magneto lead being represented as connected to ground. The output circuit of the transistor is completed by connection of the emitter lead 57 to ground through a resistor 58 which is bypassed for carrier frequencies by a capacitor 59. A bypass capacitor 60 for the lowest modulating frequency is connected across the terminals of the magneto as shown.

Feedback for promoting oscillation of the output circuit is provided by a coil 61 which is inductively coupled with the coil 40 and has one end connected to the base lead 62 of the transistor. The other end of the coil 61 is connected to the intermediate point of a voltage divider which is connected across the leads of the magneto 10. This voltage divider comprises resistors 63 and 64, the latter of which is paralleled by a bypass capacitor for carrier frequencies 65.

It may now be seen that if one of the switches 51–54 is closed and the reed of the magneto 10 is actuated, the selected LC circuit will be caused to oscillate at the resonant frequency of the LC circuit and of the transducer.

An ultrasonic wave of this frequency will accordingly be broadcast by the selected transducer. As will be apparent to those skilled in the art, an ultrasonic wave of substantial magnitude thus may be produced by a power source of low voltage and relatively small power output.

The output of the magneto 10 will again be as illustrated in FIG. 5*a*, the effective output being represented by the shaded negative half-cycles, since the transistor 55 acts as a rectifier and rejects the alternate half-cycles of the magneto output. The output of the selected transducer will again be as represented in FIG. 5*b*, consisting of intermittent bursts of high frequency sound waves. It is intended that a cooperating receiving station may be made to detect and discriminate between the various frequencies of ultrasonic waves radiated by the respective transducers, the amplitude modulation of the ultrasonic waves at the reed frequency having no effect other than to cause variation of the instantaneous intensity of the radiated wave.

While the values of most of the various resistors and capacitors employed in the circuits of FIGS. 3 and 4 are not critical, a list of recommended values is given below:

| | | | |
|---|---|---|---|
| R26 | 47 ohms | C24 | 1.0 mfd. |
| R31 | 200K | C27 | 0.1 mfd. |
| R33 | 5K | C34 | 1500 mmfd. |
| R58 | 47 ohms | C59 | 0.1 mfd. |
| R63 | 200K | C60 | 1.0 mfd. |
| R64 | 5K | C65 | .01 mfd. |

A practical ceramic type of piezoelectric transducer 20 and 41–44 has been found to have a capacity of 900 micro-microfarads. With such a capacity, the inductance of coils 21 and 40 should be approximately 17 millihenrys to produce resonance of the LC circuits in the vicinity of 40,000 cycles. The values of the capacitors 42*a*, 43*a* and 44*a* should be such as to alter the resonant frequencies of the corresponding LC circuits to the desired values.

It will now be seen that apparatus constructed in accordance with the present invention is independent of both an external power source and an internal energy storing means, such as a battery, the required energy being supplied by a finger flick or finger actuation of a conventional form of control device such as a push button. Accordingly, the apparatus is free of dangling electric power cords and does not require battery replacement. The apparatus is basically small in size and inherently reliable in operation. All these and other advantages are attained with easily assembled and inexpensive components.

Various modifications of the illustrated embodiments of the invention will be readily apparent to those skilled in the art. As previously indicated, a full wave rectifier might be employed across the leads of the magneto 10. In this case, the selected transducer may be energized substantially continuously for as long a period as the magneto reed vibrates with a substantial amplitude. Alternatively, a pair of transistors, one of the P-N-P type and the other of the N-P-N type, may be employed, whereby these signal translating devices would in themselves serve as a full wave rectifier. It will be appreciated that full wave rectification will double the frequency of modulation of the carrier wave, this being of significance where difference in frequency of amplitude modulation of the carrier wave is relied upon to distinguish between signals, as in the embodiment of FIG. 3. A filter of conventional form might also be employed to smooth the rectified magneto output and the transducer output where modulations of the signal are not desired.

Still further, it will be apparent to those skilled in the art that a magneto having a plurality of reeds of different resonant frequency may be employed with the circuitry of FIG. 3, to produce a plurality of frequencies of carrier waves, each modulated in amplitude at a plurality of lower frequencies. The various distinguishable signals thus produced might be employed, for example, to control four different functions at four different receiving stations, each station being tuned to one of four carrier frequencies, and including circuitry for distinguishing between the various frequencies of amplitude modulation of the carrier wave. Where only one signal is required it will be apparent that a magneto having only one reed may be employed with the circuit of FIG. 3. Such apparatus might be employed, for example, to actuate the channel selector switch of a television receiver set.

Accordingly, while there has been described what are at present considered to be the preferred embodiments of the invention, it will be understood that various modifications may be made therein, and it is intended to cover in the appended claims all such modifications as fall within the true spirit and scope of the invention.

What is claimed is:

1. A self-powered transmitter for generating periodic bursts of ultrasonic frequency compressional waves comprising, a piezoelectric transducer, an inductor coupled to said transducer, said transducer and said inductor forming an LC circuit resonant at said ultrasonic frequency, a transistorized oscillator having a load circuit including said LC circuit, a magneto having a voltage coil lined by a magnetic circuit and arranged to supply operating potentials to said transistorized oscillator, said magnetic circuit including a permanent magnet and a vibratable reed, said reed upon vibration changing the reluctance of said magnetic circuit and causing an alternating current voltage of a frequency equal to the frequency of vibration of said reed to be induced in said coil, at least one polarity of said induced voltage being effective to energize said oscillator and said LC circuit whereby said piezoelectric transducer generates bursts of ultrasonic frequency at a frequency equal to said frequency of vibration of said reed.

2. A self-powered transmitter for producing and radiating periodic bursts of ultrasonic frequency energy comprising, a tank circuit including a capacitative piezoelectric transducer element and an inductive element resonant at said ultrasonic frequency, a transistor having an input circuit and an output circuit, said tank circuit coupled to said output circuit, an oscillatory connection between said output circuit and said input circuit whereby upon energization said transistor oscillates at said ultrasonic frequency, a magneto power source for said transmitter, said magneto including means for producing magnetic flux, a voltage coil connected in said output circuit and linked by said flux, a magnetically permeable reed adapted for vibration at a relatively low audio frequency included in the path of said magnetic flux for varying the same upon said reed being set into vibratory motion, said voltage coil developing a voltage in accordance with fluctuations in said magnetic flux, said transistor energizable by one polarity of said voltage and deenergizable by the other polarity of said voltage to thereby cause said piezoelectric transducer to radiate bursts of said ultrasonic frequency energy, the frequency of said bursts being determined by the vibratory frequency of said reed.

3. A self-powered transmitter for producing and radiating periodic bursts of ultrasonic frequency energy comprising in combination; a transistor having a base electrode, an emitter electrode, and a collector electrode; a tank circuit resonant at said ultrasonic frequency connected between said collector electrode and said emitter electrode; said tank circuit including an inductive element and a capacitive piezoelectric transducer element; means for feeding back a portion of the voltage appearing across said tank circuit to said base electrode for causing said transistor to oscillate at said tank circuit resonant frequency; a magneto power source arranged to energize said transistor; said magneto power source including a permanent magnet for producing magnetic flux, a voltage coil linked by said flux and connected between said tank circuit and said emitter electrode, and a permeable reed, having a natural resonant vibration frequency in the low audio frequency range, arranged to carry a portion of the flux linking said coil; said reed upon being set into vibratory motion varying the magnitude of said flux linking said coil thereby resulting in an alternating current voltage of a frequency equal to the resonant frequency of said reed being induced in said voltage coil; said transistor being successively energized and deenergized by said alternating current voltage whereby said transducer element radiates bursts of ultrasonic energy at a burst frequency equal to the resonant frequency of said reed.

4. A self-powered transmitter for generating bursts of compressional waves of predetermined carrier frequency and predetermined burst rate comprising; oscillator means having an input circuit and an output circuit; an LC circuit arrangement connected in said output circuit, said LC circuit arrangement including an inductive element and a capacitive transducer element having values selected to cause resonance of said LC circuit at said predetermined carrier frequency; means interconnecting said output circuit and said input circuit for feeding back a portion of the voltage across said LC circuit for causing oscillation of said oscillator means; a magneto power source for said transmitter, said magneto including means for producing magnetic flux; a voltage coil connected in said output circuit and linked by said flux; a magnetically permeable reed adapted for vibration at said burst rate included in the path of said magnetic flux for varying said flux upon said reed being set into vibratory motion; said voltage coil developing a voltage in accordance with fluctuations in said magnetic flux and energizing said oscillator means and said LC circuit whereby said capacitive transducer element generates said compressional waves of predetermined carrier frequency at said predetermined burst rate.

5. A self-powered transmitter for producing compressional waves of a predetermined carrier frequency amplitude modulated with one of a plurality of predetermined selectable lower frequencies comprising; circuit means oscillatory at said predetermined carrier frequency, said circuit means including an inductive-capacitive tank circuit resonant at said carrier frequency; a transistor having said tank circuit as part of its load circuit; the capacitive portion of said tank circuit consisting at least in part of a piezoelectric transducer for producing said compressional waves in response to electrical excitation; a magneto having a fixed winding for energizing said tank circuit and said transistor and a plurality of vibratable permeable reeds forming a portion of the magnetic circuit of said magneto, said reeds being resonant at different predetermined frequencies and being individually actuatable to generate a voltage in said fixed winding corresponding to the actuated reed frequency whereby said circuit means is energized to produce a compressional wave of said carrier frequency amplitude modulated at the selected one of said predetermined selectable lower frequencies.

6. A self powered transmitter for selectively producing and radiating periodic bursts of a plurality of ultrasonic frequency wave energies comprising; a corresponding plurality of tank circuits each including a capacitive piezoelectric transducer element and an inductive element, each said tank circuit being resonant at a different one of said ultrasonic frequencies, a transistor having an input circuit and an output circuit, means for selectively coupling said tank circuits to said output circuit, an oscillatory connection between said output circuit and said input circuit whereby upon energization said transistor oscillates at the resonant frequency of the selected tank circuit, a magneto power source for said transmitter, said magneto including means for producing magnetic flux, a voltage coil connected in said output circuit and linked by said flux, a magnetically permeable reed adapted for vibration at a relatively low audio frequency included in the path of said magnetic flux for varying the same upon said reed being set into vibratory motion, said voltage coil developing a voltage in accordance with fluctuations in said magnetic flux, said transistor energizable by one polarity of said voltage and deenergizable by the other polarity of said voltage to thereby cause said selected piezoelectric transducer to radiate bursts of ultrasonic frequency energy at the frequency of resonance of its tank circuit, the frequency of said bursts being determined by the vibratory frequency of said reed.

References Cited in the file of this patent

UNITED STATES PATENTS

| | | |
|---|---|---|
| 1,968,617 | Osnos | July 31, 1934 |
| 1,984,424 | Osnos | Dec. 18, 1934 |
| 2,695,951 | Hupert et al. | Nov. 30, 1954 |
| 2,817,025 | Adler | Dec. 17, 1957 |
| 2,842,959 | Henry | July 15, 1958 |
| 2,897,354 | Bourget et al. | July 28, 1959 |

FOREIGN PATENTS

| | | |
|---|---|---|
| 398,418 | Great Britain | Sept. 14, 1933 |